United States Patent
Chang et al.

(10) Patent No.: US 10,958,598 B2
(45) Date of Patent: Mar. 23, 2021

(54) METHOD AND APPARATUS FOR GENERATING CANDIDATE REPLY MESSAGE

(71) Applicant: Beijing Baidu Netcom Science and Technology Co., Ltd., Beijing (CN)

(72) Inventors: Minqiang Chang, Beijing (CN); Kefeng Meng, Beijing (CN); Liang He, Beijing (CN); Ming Ma, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/055,613

(22) Filed: Aug. 6, 2018

(65) Prior Publication Data

US 2019/0081914 A1    Mar. 14, 2019

(30) Foreign Application Priority Data

Sep. 8, 2017   (CN) .......................... 201710807639.4

(51) Int. Cl.
*H04L 12/58* (2006.01)
*G06F 17/27* (2006.01)
(Continued)

(52) U.S. Cl.
CPC ............ *H04L 51/02* (2013.01); *G06F 40/186* (2020.01); *G06F 40/30* (2020.01); *H04L 51/046* (2013.01); *H04L 51/16* (2013.01)

(58) Field of Classification Search
CPC ....... H04L 51/02; H04L 51/046; H04L 51/16; G06F 17/2785; G06F 17/248
See application file for complete search history.

(56) References Cited

U.S. PATENT DOCUMENTS

2010/0268716 A1* 10/2010 Degaugue ............... G06F 16/36
                                                                 707/741
2013/0035932 A1*  2/2013 Bangalore ............ G06F 17/2785
                                                                   704/9
(Continued)

FOREIGN PATENT DOCUMENTS

| CN | 104268129 A | 1/2015 |
|---|---|---|
| CN | 106446054 A | 2/2017 |
| JP | 2016156845 A | 9/2016 |

OTHER PUBLICATIONS

ランキングアルゴリズムを用いた質問応答システムの試作, IPSJ SIG Technical Report, vol. 2013-ICS-172, No. 5, pp. 2-11E; English translation unavailable; Nov. 12, 2013 (10 pages).

*Primary Examiner* — Soe Hlaing
(74) *Attorney, Agent, or Firm* — Nixon Peabody LLP

(57) ABSTRACT

The present disclosure discloses a method and apparatus for generating a candidate reply message. A specific embodiment of the method comprises: acquiring a text message of a currently received conversation; determining whether a pre-established conversation template matching the text message exists; and generating, in response to determining a conversation template matching the text message existing, a candidate reply message on the basis of the conversation template. According to the method provided by embodiments of the present disclosure, when the text message of the currently received conversation matches the pre-established conversation template, the candidate reply message is automatically generated, and a user may click the candidate reply message for reply, so that the time for the user to edit a reply message is saved, a period for the user to communicate with others is reduced, and the communication efficiency is improved.

16 Claims, 7 Drawing Sheets

(51) Int. Cl.
*G06F 40/30* (2020.01)
*G06F 40/186* (2020.01)

(56) References Cited

U.S. PATENT DOCUMENTS

2017/0230312 A1* 8/2017 Barrett .................. H04L 51/046
2018/0174222 A1* 6/2018 Venkatakrishnan .........................
                                                  G06Q 30/0633
2018/0367484 A1* 12/2018 Rodriguez ........... G06Q 10/101

* cited by examiner

METHOD AND APPARATUS FOR GENERATING CANDIDATE REPLY MESSAGE

CROSS-REFERENCE TO RELATED APPLICATIONS

This application is related to and claims priority from Chinese Application No. 201710807639.4, filed on Sep. 8, 2017 and entitled "Method and Apparatus for Generating Candidate Reply Message," the entire disclosure of which is hereby incorporated by reference.

TECHNICAL FIELD

The present disclosure relates to the technical field of computers, specifically to the technical field of Internet, and more specifically to a method and apparatus for generating a candidate reply message.

BACKGROUND

With the rapid development of mobile Internet, intelligent mobile terminals have become indispensable communication tools in daily life and work. A plurality of social applications (e.g., instant messaging applications) may be installed on an intelligent mobile terminal.

In the prior art, a user may communicate with others using the social applications installed on the intelligent mobile terminal. After receiving a message through a social application, the user needs to edit a reply message word by word. In some application scenarios, when editing the reply message word by word, the user may also need to open other applications to find related contents and then edits the reply message. In this way, the period of communication between the user and the others is long and the efficiency is low.

SUMMARY

An objective of the present disclosure is to propose a method and apparatus for generating a candidate reply message, to solve the technical problems mentioned in the above Background section.

In a first aspect, the present disclosure provides a method for generating a candidate reply message, and the method includes: acquiring a text message of a currently received conversation; determining whether a pre-established conversation template matching the text message exists; and generating, in response to determining a conversation template matching the text message existing, a candidate reply message on the basis of the conversation template.

In a second aspect, the present disclosure provides an apparatus for generating a candidate reply message, and the apparatus includes: an acquiring unit, for acquiring a text message of a currently received conversation; a conversation template determining unit, for determining whether a pre-established conversation template matching the text message exists; and a candidate reply message generating unit, for generating, in response to determining a conversation template matching the text message existing, a candidate reply message on the basis of the conversation template.

In a third aspect, the present disclosure provides a device, namely a mobile terminal including one or more processors, and a storage device for storing one or more programs. When the one or more programs are executed by the one or more processors, the one or more processors may implement the method for generating a candidate reply message.

In a fourth aspect, the present disclosure provides a computer readable storage medium for storing a computer program, and when the program is executed by a processor, the method for generating a candidate reply message is implemented.

According to the method and apparatus for generating a candidate reply message, provided by the present disclosure, by acquiring a text message of a currently received conversation, and then determining whether a pre-established conversation template matching the text message exists, a candidate reply message is finally generated on the basis of the conversation template matching the text message in response to determining that the conversation template exists. According to the method provided by embodiments of the present disclosure, when the text message of the currently received conversation matches the pre-established conversation template, the candidate reply message is automatically generated on the basis of the conversation template, and a user may click the candidate reply message for reply, so that the time for the user to edit a reply message is saved, a period for the user to communicate with others is reduced, and the communication efficiency is improved.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
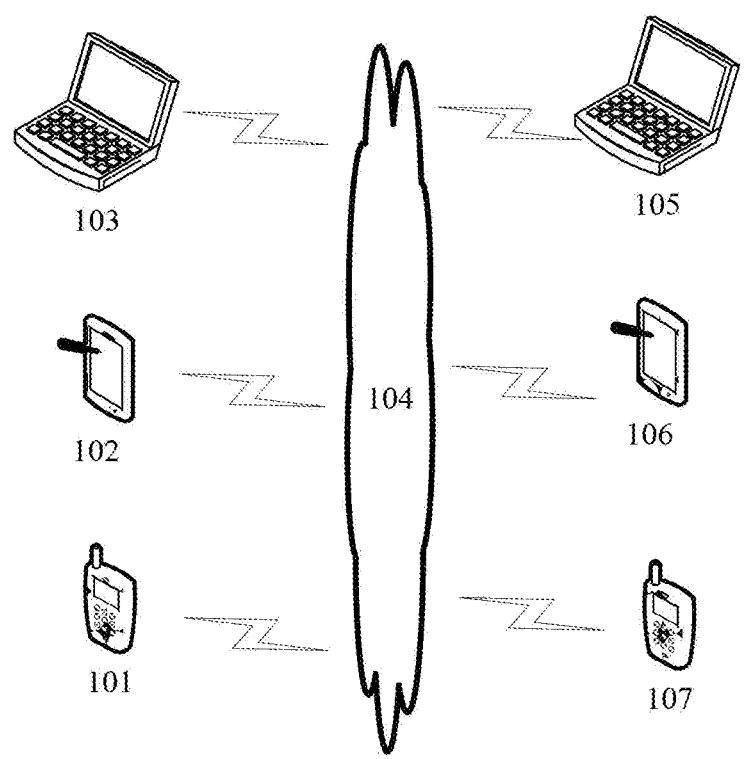
FIG. 1 is an architectural diagram of an exemplary system in which the present disclosure may be implemented.

FIG. 1 shows an exemplary system architecture 100 which may be used by a method for generating a candidate reply message or an apparatus for generating a candidate reply message according to the embodiments of the present disclosure.

As shown in FIG. 1, the system architecture 100 may include mobile terminals 101, 102 and 103, a network 104, and terminal devices 105, 106 and 107. The network 104 serves as a medium providing a communication link between the mobile terminals 101, 102 and 103 and the terminal devices 105, 106 and 107. The network 104 may include various types of connections, such as wired or wireless transmission links, or optical fibers.

The terminal devices 105, 106 and 107 may send information to the mobile terminals 101, 102 and 103 through the network 104. Various communication client applications, such as social applications, may be installed on the mobile terminals 101, 102 and 103 and the terminal devices 105, 106 and 107.

The mobile terminals 101, 102 and 103 and the terminal devices 105, 106 and 107 may be various electronic devices having display screens and supporting wireless communication, including but not limited to smart phones, tablet computers, laptop portable computers.

It should be noted that the method for generating a candidate reply message, provided by embodiments of the present disclosure, may be generally executed by the mobile terminals 101, 102 and 103, and accordingly, the apparatus for generating a candidate reply message is generally arranged in the mobile terminals 101, 102 and 103. It should be appreciated that the method for generating a candidate reply message, provided by embodiments of the present disclosure, may also be executed by the terminal devices 105, 106 and 107, and accordingly, the apparatus for generating a candidate reply message may also be arranged in the terminal devices 105, 106 and 107.

It should be understood that the numbers of the mobile terminals and the terminal devices in FIG. 1 are merely illustrative. Any number of the mobile terminals, networks and terminal devices may be provided based on the actual requirements.

Figure 2:
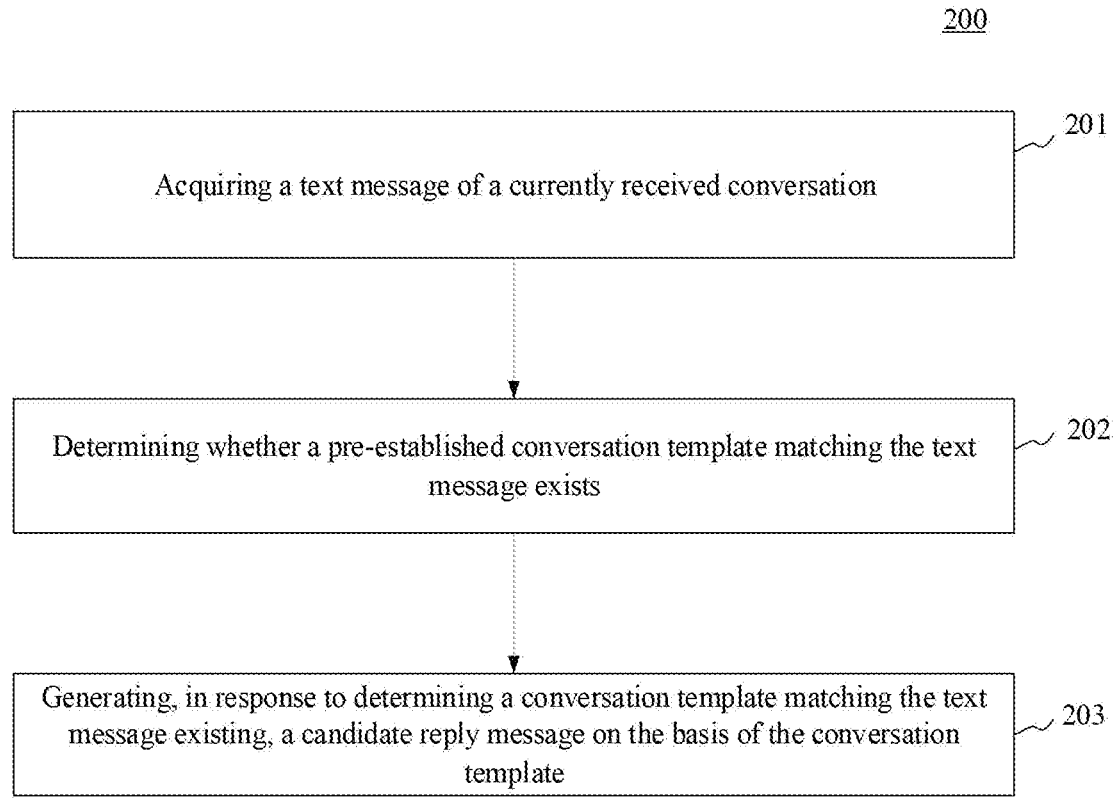
FIG. 2 is a flowchart of an embodiment of a method for generating a candidate reply message according to the present disclosure.

Further referring to FIG. 2, FIG. 2 shows a flow 200 of an embodiment of the method for generating a candidate reply message according to the present disclosure. The method for generating a candidate reply message includes the following steps.

Step 201, acquiring a text message of a currently received conversation.

In the present embodiment, an electronic device (e.g., the mobile terminals 101, 102 and 103 shown in FIG. 1) on which the method for generating a candidate reply message is performed may be installed with at least one social application, e.g., an instant messaging application.

A user may send or receive a communication message in a window of a social application installed on the electronic device in a process of exchanging information with a user using a terminal device (e.g., the terminal devices 105, 106 and 107 shown in FIG. 1) using a conversation window through a wireless connection or a wired connection, and the communication message may include a text message, a voice message, or a picture message.

If the user is using a social application installed on the electronic device to have a conversation with the other party, the electronic device may acquire a text message of the current conversation of the application through various methods.

In some application scenarios, conversation messages displayed in the social application may all be text messages. In this case, the electronic device may capture a picture including the conversation messages displayed on a screen, and recognize a text message in the picture using an image-to-character recognition OCR (Optical Character Recognition) method. Further, the last conversation message may be found based on a sequence; and if the last conversation message is a received message, the last message may be used as a text message of the currently received conversation.

In some application scenarios, the electronic device may acquire all the conversation messages being displayed by the social application through a predetermined interface, and extract the last conversation message as a message of the currently received conversation based on a sequence. Optionally, the above conversation message may be a text message, a voice message, or a picture message. If the message of the currently received conversation is a voice message or a picture message, the electronic device may convert the voice message or the picture message into a text message.

Specifically, the electronic device may convert the voice message or the picture message into a text message. When converting the voice message into a text message, an existing voice recognition technology may be used for conversion. When a picture is included in the conversation message and a text content is included in the picture, the OCR method may be used to recognize the text content in the picture.

Step 202, determining whether a pre-established conversation template matching the text message exists.

The electronic device (e.g., the mobile terminals 101, 102 and 103 shown in FIG. 1) on which the method for generating a candidate reply message is performed may be preset with a plurality of conversation templates. After the text message of the currently received conversation is acquired in step 201, the electronic device may first extract keywords from the text message. Then, the electronic device determines whether a pre-established conversation template matching the text message exists based on the keywords. In addition, the electronic device may also send the text message to a remote server for the remote server to perform word segmentation and keyword extraction on the text message.

The pre-established conversation template may include a text description, composed of a plurality of words, of the conversation template. In the process of matching the text message with the conversation template, each keyword of the text message may be compared with each word in a conversation template. When a keyword is exactly the same as a word in a conversation template, it may be considered that the keyword is successfully matched with the word in the conversation template. Further, the conversation template may also include synonyms of each word; when a keyword is compared with each word in the conversation template, the keyword may also be compared with the synonyms of a word in the conversation template; and when the keyword is successfully matched with a synonym of a word, it may be considered that the keyword is successfully matched with the word.

When a keyword is successfully matched with a word in a conversation template, it may be considered that the conversation template includes the keyword. A conversation template including the most keywords of the text message may be used as a conversation template matching the text message. When each keyword of the text message fails to match each word in any conversation template, it may be considered that no pre-established conversation template matching the text message exists.

Step 203, generating, in response to determining a conversation template matching the text message existing, a candidate reply message on the basis of the conversation template.

In the present embodiment, for each conversation template, the electronic device may pre-store a plurality of candidate reply messages associated with the conversation template, that is, each conversation template may be pre-associated with a plurality of candidate reply messages. The plurality of candidate reply messages may be artificially set messages. The electronic device may generate a candidate reply message on the basis of the conversation template when it is determined in step 202 that the conversation template matching the text message exists. Specifically, the electronic device may find a plurality of candidate reply messages associated with the conversation template matching the text message, and randomly extract a predetermined number of candidate reply messages to be presented in a conversation window for selection by a user.

According to the method for generating a candidate reply message, provided by the embodiments of the present disclosure, by acquiring a text message of a currently received conversation, and then determining whether a pre-established conversation template matching the text message exists, a candidate reply message is finally generated on the basis of the conversation template matching the text message in response to determining that the conversation template exists. According to the method provided by embodiments of the present disclosure, when the text message of the currently received conversation matches the pre-established conversation template, the candidate reply message is automatically generated, and a user may click the candidate reply message for reply, so that the time for the user to edit a reply message is saved, a period for the user to communicate with others is reduced, and the communication efficiency is improved.

In some optional implementations of the present embodiment, the electronic device may also match the text message with a plurality of pre-established conversation templates. That is to say, the electronic device does not need to extract keywords from the text message, but directly matches the entire text message with the plurality of pre-established conversation templates. Different matching degrees may be set based on the number of matched words between the text message and the conversation template. The more the matched words between the text message and the conversation template are, the greater the matching degree is. The electronic device may take a conversation template having a matching degree greater than a preset threshold with the text message as the conversation template matching the text message. Further, a conversation template having a largest matching degree greater than a preset threshold with the text message is used as the conversation template matching the text message. In addition, a thesaurus of words with same or similar meanings, a thesaurus of modal particles that may be substituted for each other, adverbs of degree that express different degrees may also be established for the words in a conversation template. When matching the text message with the conversation template, the text message may be matched with the conversation template including same or similar thesauruses character by character or word by word. For example, the pre-established conversation templates include two pre-established conversation templates of "I have to go home" and "Are you going to go home." The template "Are you going to go home" may include a modal particle "gonna" that may replace "going to." When template matching is performed on the text message "Are you gonna go home," the matching degree between the text message and the conversation template of "I have to go home" is, for example, 25%, and the matching degree between the text message and the conversation template of "Are you going to go home" is, for example, 100%. In this way, the conversation template matching the text message is the pre-established conversation template of "Are you going to go home."

In some optional implementations of the present embodiment, the electronic device may also store a plurality of candidate reply messages associated with the conversation template and obtained by counting on the basis of a plurality of historical conversation records of the user. Moreover, the electronic device may also store the frequency of appearance of each candidate reply message in the plurality of historical conversation records. Further, after the electronic device determines the conversation template matching the text message, each candidate reply message associated with the conversation template may be presented in a conversation window in a descending order based on the frequency of appearance of each candidate reply message in the plurality of historical conversations. In this way, the candidate reply message generated based on the conversation template may be closer to a natural language, so that people in conversation may not have a sense of discomfort.

In some optional implementations, the conversation template may also be set in a remote server. When the conversation template is set in the remote server, the electronic device may send the text message, acquired in step 201, of the currently received conversation to the remote server, and the remote server executes the operation of matching the text message with the conversation template. When the remote server obtains the conversation template matching the text message, the remote server may send the conversation template obtained by matching to the electronic device. When the remote server does not obtain the conversation template matching the text message, the remote server may return a message of matching failure to the electronic device.

Figure 3:
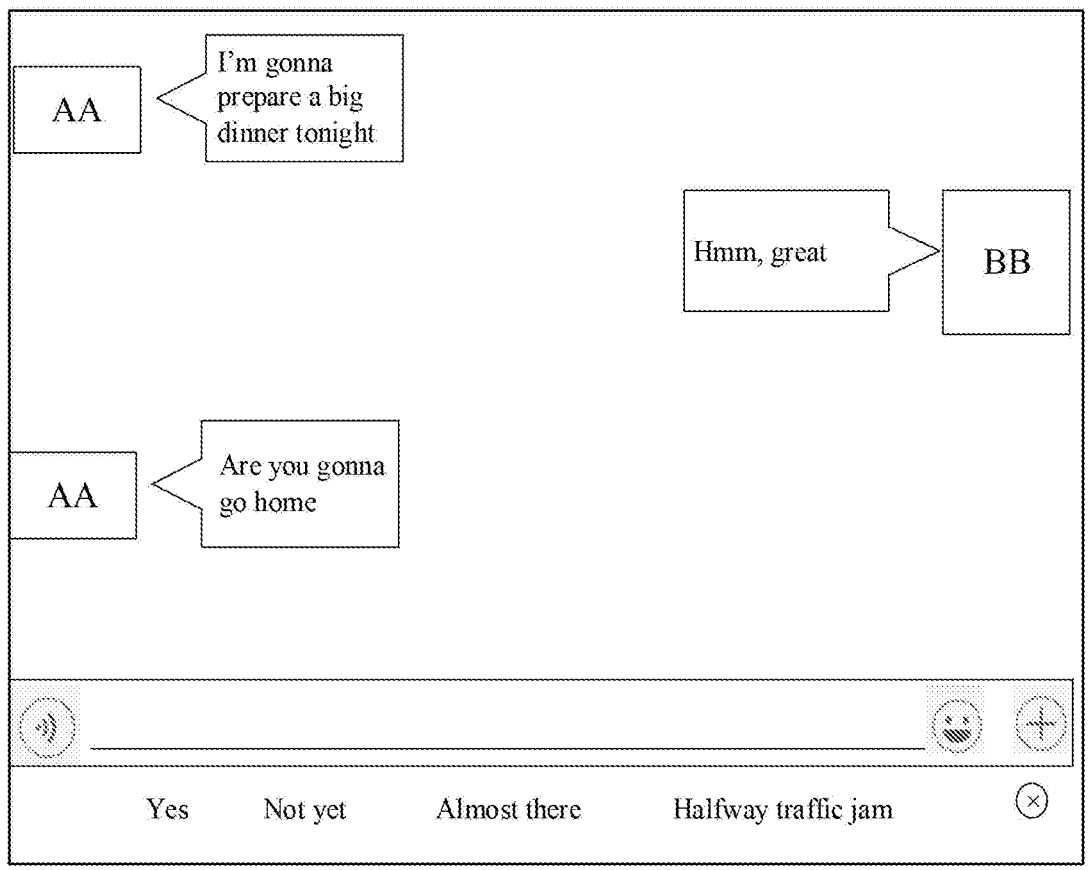
FIG. 3 is a schematic diagram of an application scenario of the method for generating a candidate reply message according to the present disclosure.

Please refer to FIG. 3, FIG. 3 shows a schematic diagram of an application scenario of the method for generating a candidate reply message according to the present disclosure.

As shown in FIG. 3, after a mobile terminal device (a user BB) receives the latest text message sent by a terminal device (a user AA), the mobile terminal device may obtain all conversation records in a conversation window opened by a user, and a text message of "Are you gonna go home" of the currently received conversation is obtained through analysis. Then, the mobile terminal may determine whether a pre-established conversation template matching the text message of "Are you gonna go home" exists. Specifically, the text message of "Are you gonna go home" may be wholly matched with each pre-established conversation template word by word, and the pre-established conversation template with the highest matching degree is taken as the conversation template matching the text message of the current conversation. After the matching, a template matching "Are you gonna go home," namely a conversation template of "Are you going to go home" is obtained. A plurality of candidate reply messages associated with the conversation template of "Are you going to go home" are preset in the mobile terminal device, such as "Yes," "Not yet," "Almost there," and "Halfway traffic jam." The candidate messages may be displayed in a conversation window after being sorted based on the frequency of appearance in a plurality of historical conversation records. The mobile terminal device may present the reply message associated with the conversation template in the conversation window, upload the reply message to the conversation window as a reply message after clicking and confirming by a user, and send the reply message to the terminal device (the user AA) through a wired connection or a wireless connection.

Figure 4:
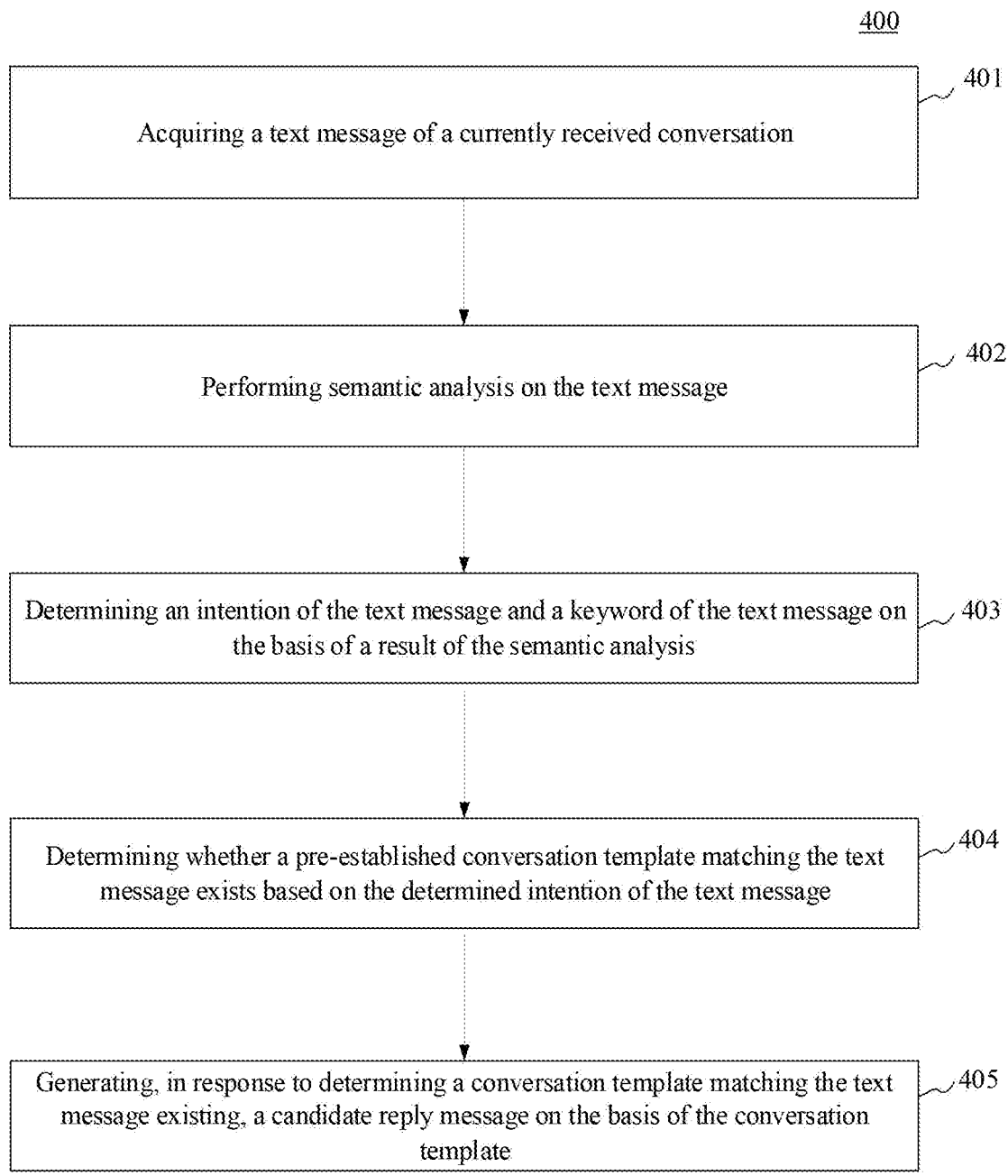
FIG. 4 is a flowchart of another embodiment of the method for generating a candidate reply message according to the present disclosure.

Further referring to FIG. 4, it shows a flow 400 of another embodiment of the method for generating a candidate reply message according to the present disclosure.

As shown in FIG. 4, the method for generating a candidate reply message includes the following steps.

Step 401, acquiring a text message of a currently received conversation.

Step 401 may be the same as step 201 of the embodiment shown in FIG. 2 and will not be repeatedly described here.

Step 402, performing semantic analysis on the text message.

In the present embodiment, after the text message of the current conversation is acquired in step 401, the electronic device (e.g., the mobile terminal devices 101, 102 and 103 shown in FIG. 1) on which the method for generating a candidate reply message is performed may perform semantic analysis on the text message. The text message may be subjected to semantic analysis using a widely used semantic analysis method for natural languages at present. Specifically, the text message may be subjected to lexical analysis first, then syntactic analysis, and finally semantic analysis. The lexical analysis may include, for example, word segmentation of the text message, part-of-speech tagging of each word obtained after word segmentation, identification of named entities, and word sense disambiguation of each word. For example, a word segmentation result of a text message of "Do you have XX's mobile phone number" may be "Do," "you," "have," "XX's," "mobile phone number." In the syntactic analysis, an existing phrase structure syntactic system analysis method or dependency structure syntactic system analysis method may be used to analyze collocation or modification relationships between the words in the text message after the word segmentation. For example, "XX's" modifies "mobile phone number." Further, the verb "have" and "XX's mobile phone number" are in a verb-object collocation relationship. Finally, a semantic analysis result is further obtained based on the syntactic analysis.

In some optional implementations of the present embodiment, in the process of performing semantic analysis on the text message, the current text message may be subjected to semantic analysis in conjunction with a text message of a historical conversation in the current conversation window. In this way, the semantic analysis of the currently received text message is performed in conjunction with contexts, thereby improving the accuracy of the semantic analysis result.

Step 403, determining an intention of the text message and a keyword of the text message on the basis of a result of the semantic analysis.

After obtaining the semantic analysis result of the text message in step 402, the electronic device may determine the intention of the text message. In addition, keywords of the text message may be obtained in the processes of lexical analysis and syntactic analysis. The keywords here may refer to nouns in the text message, such as a person name, an object name, a noun representing a geographical position, and an interrogative pronoun. For example, the keywords in the text message of "Do you have XX's mobile phone number" may be, for example, "XX" and "mobile phone number."

The intention of the text message may be determined based on the semantic analysis result in step 402. For example, the text message of "Do you have XX's mobile phone number" and a text message "Do you know XX's contact number" are both intended to inquire XX's contact information.

Step 404, determining whether a pre-established conversation template matching the text message exists based on the determined intention of the text message.

After determining the intention of the text message in step 403, the electronic device may determine whether a pre-established conversation template matching the text message exists.

For example, after determining that the intention of the text message of "Do you have XX's mobile phone number" is an intention of inquiring xx's contact information, whether a pre-established conversation template of "Inquire xx's contact information" matching the text message exists may be determined based on the intention.

Step 405, generating, in response to determining a conversation template matching the text message existing, a candidate reply message on the basis of the conversation template.

In the present embodiment, the conversation template matching the text message may be preset with an interface for calling an associated application. The associated application is associated with the conversation template. That is to say, each conversation template may be preset with an interface for calling an associated application associated with the conversation template. The electronic device may acquire a candidate reply message on the basis of the interface of the associated application and the keywords.

For example, the conversation template of "Inquire xx's contact information" may be preset with an interface for calling an address book application. When determining that the text message matches the conversation template of "Inquire xx's contact information," the electronic device may find a phone number corresponding to the keyword "XX" from an address book through the interface and present the phone number in a currently opened conversation window.

In some application scenarios, when the text message acquired through semantic analysis is intended to obtain a position of a user or other private information, a brief prompt of the intention may be presented in the conversation window. When the user clicks on the prompt, a candidate reply message may be acquired through an interface preset in the template matching the intention. For example, a text message of "Please send me your photos" is subjected to semantic analysis to obtain that the intention of the text message is to ask for pictures related to a user. In this case, a short prompt of "Acquire pictures" may be presented in the conversation window. If the user clicks on the prompt, the electronic device may present a predetermined number of pictures in a picture library in the conversation window based on a certain time sequence through an interface for calling a picture library preset in a conversation template of "Acquire pictures." The user may select one or more pictures from the predetermined number of pictures through a click operation. The electronic device may upload the picture selected by the user to a conversation window as a reply message.

In addition, the preset conversation templates may further include a template of "Query weather," a template of "Query calendar," a template of "Send mail,". Each conversation template may be preset with an interface for calling an associated application associated with the conversation template. For example, the conversation template of "Query weather" may be set with an interface for calling a web page with a specified uniform resource locator (URL) address; the conversation template of "Query calendar" may be set with an interface for calling a calendar application; and the conversation template of "Send mail" may be set with an interface for calling a mailbox client. The electronic device may acquire a candidate reply message related to keywords through an interface of an associated application based on the keywords of a text message and present the candidate reply message in a conversation window.

In the present embodiment, the executive objects of steps 402 to 405 are all electronic devices (e.g., the mobile terminal devices 101, 102 and 103 shown in FIG. 1). It should be appreciated that the executive objects of steps 402 to 405 may also be remote servers. When the executive objects of step 402 to 405 are remote servers, the electronic device may acquire the text message of the currently received conversation in step 401, upload the text message to the remote servers, and the remote servers execute the operations of step 402 to 405 described above.

Figure 5A:
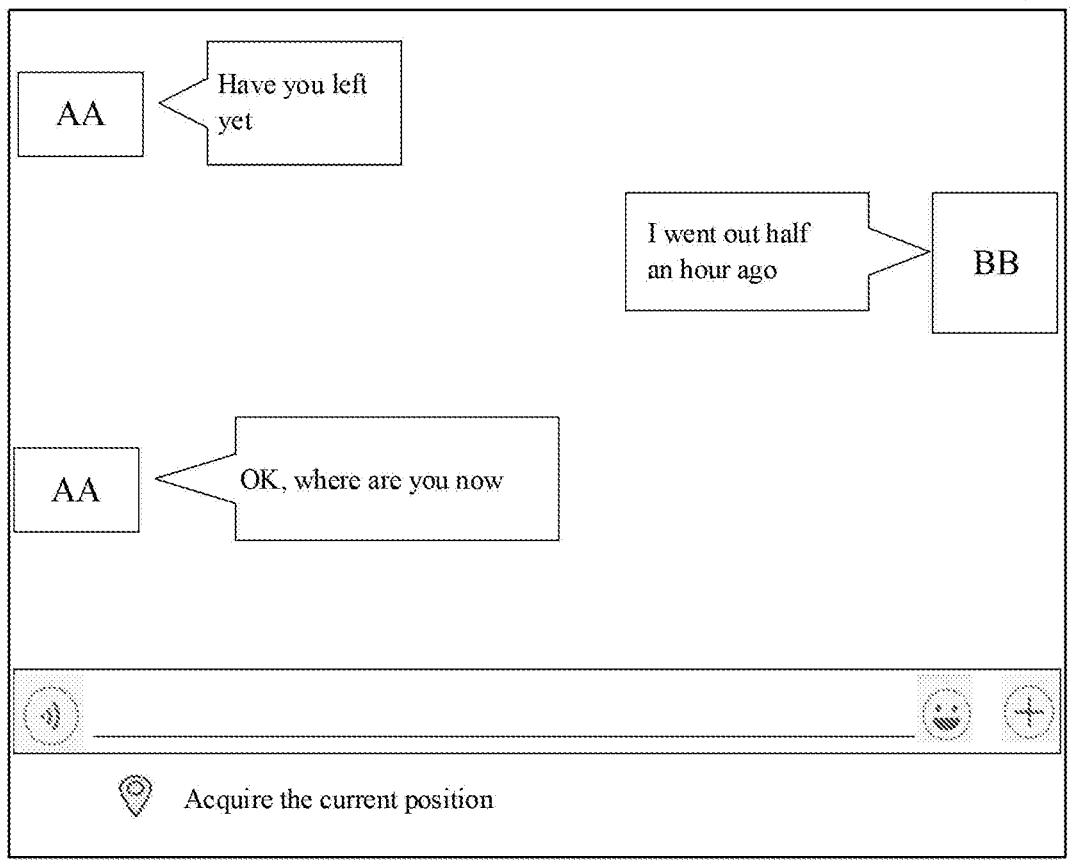
FIG. 5A and FIG. 5B are schematic diagrams of another application scenario of the method for generating a candidate reply message according to the present disclosure.
Figure 5B:
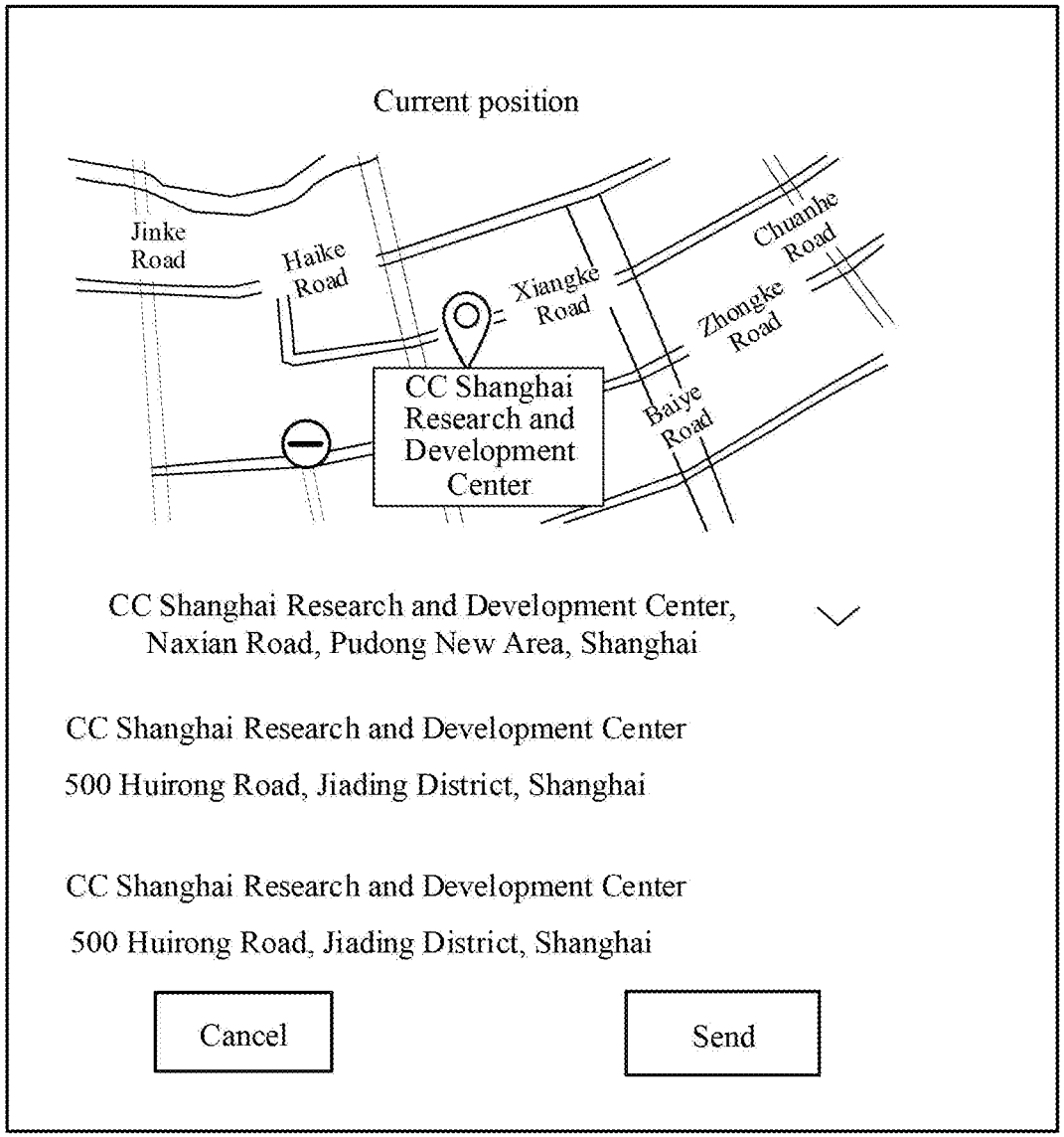

Please refer to FIG. 5A and FIG. 5B, FIG. 5A and FIG. 5B show a schematic diagram 500 of another application scenario of the method for generating a candidate reply message according to the present disclosure.

As shown in FIG. 5A, when a mobile terminal device (a user BB) receives the latest text message "Where are you now" sent by a terminal device (a user AA), the mobile terminal device (the user BB) performs semantic analysis on the text message and obtains an intention of the text message as "Acquire the current position." Moreover, whether a conversation template of "Acquire the current position" exists is determined based on the intention. In addition, the user may be prompted with "Acquire the current position" in the currently opened conversation window. If the mobile terminal device determines that a conversation template matching the intention exists, and the user clicks the prompt of "Acquire the current position," the mobile terminal device may, in response to the click operation of the user, acquire current position information (the current position information may be, for example, latitude and longitude information) through an interface for calling a positioning application (e.g., GPS positioning) preset in the conversation template of "Acquire the current position." Then, the geographical position information of the user is obtained through the position information, as shown in FIG. 5B. The geographical position information may include a street name, a house number, a building name. As shown in FIG. 5B, the current position is "CC Shanghai Research and Development Center." When the user clicks "Send," the mobile terminal device may send "CC Shanghai Research and Development Center" and "500 Huirong Road, Jiading District, Shanghai" to the terminal device (the user AA). The mobile terminal device may send the current latitude and longitude information to a remote server for the remote server to generate geographical position information based on the latitude and longitude information and send the geographical position information to the mobile terminal device. Optionally, the mobile terminal device may also acquire the current geographical position information based on the longitude and latitude information through a map application set locally.

Figure 6:
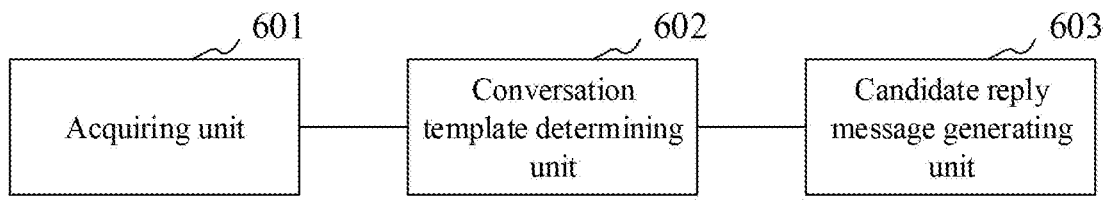
FIG. 6 is a structural schematic diagram of an embodiment of an apparatus for generating a candidate reply message according to the present disclosure.

Further refer to FIG. 6, as the implementation of the method shown in FIG. 2, the present disclosure provides an embodiment of the apparatus for generating a candidate reply message, the embodiment of the apparatus corresponds to the embodiment of the method shown in FIG. 2, and the apparatus specifically may be applied to various types of electronic devices.

As shown in FIG. 6, the apparatus 600 for generating a candidate reply message in the present embodiment includes an acquiring unit 601, a conversation template determining unit 602, and a candidate reply message generating unit 603. The acquiring unit 601 is configured for acquiring a text message of a currently received conversation; the conversation template determining unit is configured for determining whether a pre-established conversation template matching the text message exists; and the candidate reply message generating unit 603 is configured for generating, in response to determining a conversation template matching the text message existing, a candidate reply message on the basis of the conversation template.

In the present embodiment, specific processing of and technical effects brought by the acquiring unit 601, the conversation template determining unit 602 and the candidate reply message generating unit 603 of the apparatus 600 for generating a candidate reply message may refer to related descriptions of step 201, step 202 and step 203 of the corresponding embodiment in FIG. 2 respectively, and will not be repeatedly described here.

In some optional implementations of the present embodiment, the acquiring unit 601 is further configured for acquiring a currently received voice message or picture message and converting the voice message or the picture message into the text message. The descriptions of converting the voice message into a text message and the picture message into a text message may refer to related descriptions in the embodiment shown in FIG. 2, and will not be repeatedly described here.

In some optional implementations of the present embodiment, the conversation template determining unit is further configured for: matching the text message with a plurality of pre-established conversation templates; and using a conversation template having a matching degree greater than a preset threshold with the text message as a conversation template matching the text message. The description of determining the conversation template matching the text message by the conversation template determining unit may refer to the description of the embodiment shown in FIG. 2, and will not be repeatedly described here.

In some optional implementations of the present embodiment, the conversation template may be pre-associated with a plurality of candidate reply messages obtained by counting on the basis of a plurality of historical conversations. The candidate replay message generating unit is further configured for presenting each candidate reply message in a descending order based on a frequency of appearance of each candidate reply message in the plurality of historical conversations.

In some optional implementations of the present embodiment, the conversation template determining unit is further configured for performing semantic analysis on the acquired text message of the currently received conversation, and determining an intention of the text message and keywords of the text message on the basis of the result of the semantic analysis. Moreover, the conversation template determining unit determines whether a pre-established conversation template matching the text message exists based on the determined intention of the text message.

In some optional implementations of the present embodiment, the conversation template determining unit is further configured for performing semantic analysis on the text message of the currently received conversation in conjunction with a text message of a historical conversation displayed in a current conversation window.

In some optional implementations of the present embodiment, the conversation template is preset with an interface for calling an associated application associated with the conversation template; and the candidate reply message generating unit is further configured for acquiring the candidate reply message on the basis of the interface of the associated application and the keywords.

According to the method and apparatus for generating a candidate reply message, provided by embodiments of the present disclosure, when the text message of the currently received conversation matches the pre-established conversation template, the candidate reply message is automatically generated, and a user may click the candidate reply message for reply, so that the time for the user to edit a reply message is saved, a period for the user to communicate with others is reduced, and the communication efficiency is improved.

Figure 7:
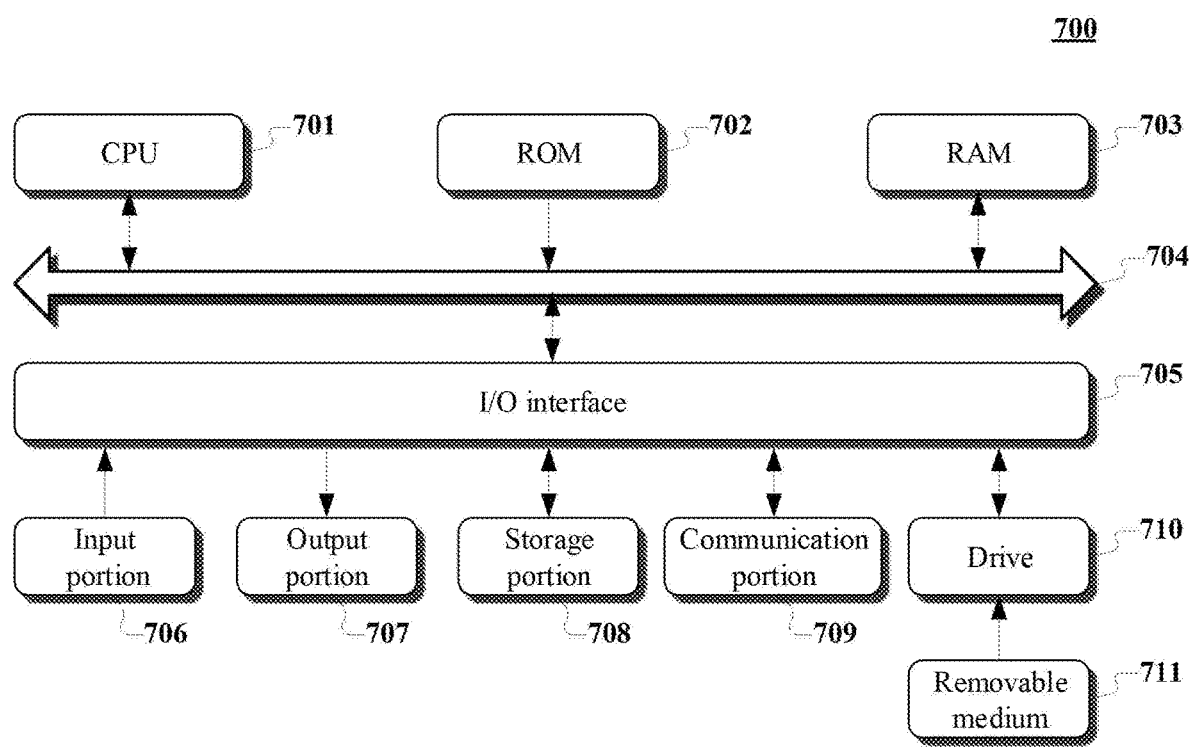
FIG. 7 is a structural schematic diagram of a computer system adapted to implement a device according to embodiments of the present disclosure.

Referring to FIG. 7, a schematic structural diagram of a computer system 700 adapted to implement an electronic device of the embodiments of the present disclosure is shown. The electronic device shown in FIG. 7 is merely an example, and should not bring any limitations to the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquiring unit, a conversation template determining unit, and a candidate reply message generating unit, where the names of these units do not in some cases constitute a limitation to such units themselves. For example, the acquiring unit may also be described as "a unit for acquiring a text message of a currently received conversation."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: acquiring a text message of a currently received conversation; determining whether a pre-established conversation template matching the text message exists; and generating, in response to determining a conversation template matching the text message existing, a candidate reply message on the basis of the conversation template.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a candidate reply message for a first user of a first device, the method comprising:
    acquiring a text message of a currently received conversation sent from a second device;
    performing semantic analysis on the text message, and determining a keyword of the text message on the basis of a result of the semantic analysis;
    determining, in pre-established conversation templates, whether a pre-established conversation template matching the text message exists,
    generating, in response to determining the pre-established conversation template matching the text message existing, a candidate reply message on the basis of the pre-established conversation template matching the text message, wherein the pre-established conversation template matching the text message is preset with an interface for calling an associated application associated with the pre-established conversation template, and the generating the candidate reply message on the basis of the pre-established conversation template matching the text message comprises: acquiring the candidate reply message on the basis of an interface of the associated application and the keyword; and
    presenting the generated candidate reply message on the first device, for the first user to click on the generated candidate reply message for replying,
    wherein the interface for calling the associated application associated with the pre-established conversation template matching the text message comprises an interface for calling a positioning application;
    wherein the acquiring the candidate reply message on the basis of the interface of the associated application and the keyword comprises: acquiring latitude and longitude information through the interface for calling the positioning application; and
    generating geographical position information based on the latitude and longitude information as the candidate reply message.

2. The method according to claim 1, wherein the acquiring a text message of a currently received conversation comprises:
    acquiring a currently received voice message or picture message; and
    converting the voice message or the picture message into the text message.

3. The method according to claim 1, wherein the determining whether a pre-established conversation template matching the text message exists comprises:
    matching the text message with a plurality of pre-established conversation templates; and
    using a pre-established conversation template having a matching degree greater than a preset threshold with the text message as the conversation template matching the text message.

4. The method according to claim 3, wherein
    the generating, in response to determining a pre-established conversation template matching the text message existing, a candidate reply message on the basis of the pre-established conversation template comprises:
    presenting each candidate reply message in a descending order based on a frequency of appearance of each candidate reply message in the plurality of historical conversations.

5. The method according to claim 1, wherein the determining whether a pre-established conversation template matching the text message exists comprises:
    determining an intention of the text message on the basis of a result of the semantic analysis; and
    determining whether a pre-established conversation template matching the text message exists based on the determined intention of the text message.

6. The method according to claim 5, wherein the performing semantic analysis on the text message comprises:
    performing semantic analysis on the text message of the currently received conversation in conjunction with a text message of a historical conversation displayed in a current conversation window.

7. The method according to claim 1, wherein the pre-established conversation templates are preset with interfaces for calling associated applications associated with the pre-established conversation templates, the interfaces for calling associated applications associated with the pre-established conversation templates comprise:
    an interface for calling an address book application;
    an interface for calling a picture library;
    an interface for calling a calendar application;
    an interface for calling a mailbox client;
    the interface for calling the positioning application; and
    an interface for calling a map application set locally.

8. The method according to claim 1, wherein the acquiring the candidate reply message on the basis of the interface of the associated application and the keyword comprises:
    presenting a prompt of an intention of the text message on the first device;
    acquiring the candidate reply message on the basis of the interface of the associated application and the keyword in response to the prompt is clicked.

9. The method according to claim 1, wherein the acquiring the candidate reply message on the basis of an interface of the associated application and the keyword, comprises:
    acquiring, through the interface of the associated application, the candidate reply message related to the keyword from the associated application, and presenting the candidate reply message in a conversation window.

10. An apparatus for generating a candidate reply message for a first user of a first device, the apparatus comprising:
- at least one processor; and
- a memory storing instructions, the instructions when executed by the at least one processor, cause the at least one processor to perform operations, the operations comprising:
- acquiring a text message of a currently received conversation sent from a second device;
- performing semantic analysis on the text message, and determining a keyword of the text message on the basis of a result of the semantic analysis;
- determining, in pre-established conversation templates, whether a pre-established conversation template matching the text message exists; and
- generating, in response to determining the pre-established conversation template matching the text message existing, a candidate reply message on the basis of the pre-established conversation template matching the text message, wherein the pre-established conversation template matching the text message is preset with an interface for calling an associated application associated with the pre-established conversation template, and the generating the candidate reply message on the basis of the pre-established conversation template matching the text message comprises: acquiring the candidate reply message on the basis of the interface of the associated application and the keyword; and
- presenting the generated candidate reply message on the first device, for the first user to click on the generated candidate reply message for replying,
- wherein the interface for calling the associated application associated with the pre-established conversation template matching the text message comprises an interface for calling a positioning application;
- wherein the acquiring the candidate reply message on the basis of the interface of the associated application and the keyword comprises: acquiring latitude and longitude information through the interface for calling the positioning application; and
- generating geographical position information based on the latitude and longitude information as the candidate reply message.

11. The apparatus according to claim 10, wherein the acquiring a text message of a currently received conversation comprises:
- acquiring a currently received voice message or picture message; and
- converting the voice message or the picture message into the text message.

12. The apparatus according to claim 10, wherein the determining whether a pre-established conversation template matching the text message exists comprises:
- matching the text message with a plurality of pre-established conversation templates; and
- using the pre-established conversation template having a matching degree greater than a preset threshold with the text message as the pre-established conversation template matching the text message.

13. The apparatus according to claim 12, wherein the generating, in response to determining the pre-established conversation template matching the text message existing, a candidate reply message on the basis of the pre-established conversation template comprises:
- presenting each candidate reply message in a descending order based on a frequency of appearance of each candidate reply message in the plurality of historical conversations.

14. The apparatus according to claim 10, wherein the determining whether a pre-established conversation template matching the text message exists comprises:
- determining an intention of the text message on the basis of a result of the semantic analysis; and
- determining whether a pre-established conversation template matching the text message exists based on the determined intention of the text message.

15. The apparatus according to claim 14, wherein the performing semantic analysis on the text message comprises:
- performing semantic analysis on the text message of the currently received conversation in conjunction with a text message of a historical conversation displayed in a current conversation window.

16. A non-transitory computer storage medium storing a computer program, the computer program when executed by one or more processors, causes the one or more processors to perform operations; the operations comprising:
- acquiring a text message of a currently received conversation sent from a second user via a second device;
- performing semantic analysis on the text message, and determining a keyword of the text message on the basis of a result of the semantic analysis;
- determining whether a pre-established conversation template matching the text message exists;
- generating, in response to determining the pre-established conversation template matching the text message existing, a candidate reply message on the basis of the per-established conversation template matching the text message, wherein the pre-established conversation template is preset with an interface for calling an associated application associated with the pre-established conversation template matching the text message, and the generating the candidate reply message on the basis of the pre-established conversation template matching the text message comprises: acquiring the candidate reply message on the basis of the interface of the associated application and the keyword; and
- presenting the generated candidate reply message on a first device, for a first user to click on the generated candidate reply message for replying,
- wherein the interface for calling the associated application associated with the pre-established conversation template matching the text message comprises an interface for calling a positioning application;
- wherein the acquiring the candidate reply message on the basis of the interface of the associated application and the keyword comprises: acquiring latitude and longitude information through the interface for calling the positioning application; and
- generating geographical position information based on the latitude and longitude information as the candidate reply message.

* * * * *